Patented Aug. 16, 1927.

1,638,834

UNITED STATES PATENT OFFICE.

MOSES L. CROSSLEY, OF BOUNDBROOK, AND MAURICE L. DOLT, OF SOMERVILLE, NEW JERSEY, ASSIGNORS TO THE CALCO CHEMICAL COMPANY, OF BOUNDBROOK, NEW JERSEY, A CORPORATION OF NEW JERSEY.

IRON SALT OF 2-PHENYLQUINOLINE-4-CARBOXYLIC ACID AND PROCESS OF MAKING THE SAME.

No Drawing.      Application filed June 9, 1925. Serial No. 36,012.

This invention relates to the manufacture of the iron salt of 2-phenylquinoline-4-carboxylic acid which salt has the formula:

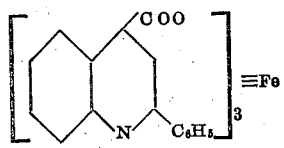

The new product may be obtained by treating an aqueous solution of the sodium salt or any other soluble salt of 2-phenylquinoline-4-carboxylic acid with an aqueous solution of a soluble ferric salt such as ferric ammonium sulfate, and, thereafter extracting the ferric salt of 2-phenylquinoline-4-carboxylic acid as hereinafter described.

100 parts of pure 2-phenylquinoline-4-carboxylic acid are dissolved in 155.7 parts of 10% NaOH and 1500 part of water. The resulting solution is filtered if not absolutely clear. To this solution is added, while stirring, a solution of 64.5 parts of ferric ammonium sulfate $$(Fe_2(SO_4)_3 \cdot (NH_4)_2SO_4 \cdot 24H_2O)$$

in about 400 parts of water. The precipitate which forms is filtered off and washed with water, dried and powdered. The dry powder is then placed in a Soxhlet extractor and completely extracted with 1900 parts of acetone. The acetone solution is cooled and the precipitate formed is filtered off and discarded. The filtrate is concentrated down to one fourth of its original volume and cooled. The precipitate which forms is filtered off, washed with a little acetone and dried. The product thus obtained is the neutral ferric salt of 2-phenylquinoline-4-carboxylic acid and corresponds to the formula $(C_{15}H_{10}N.CO_2)_3Fe$.

The ferric salt of 2-phenylquinoline-4-carboxylic acid is a brown amorphous powder, insoluble in water, soluble in alcohol and in acetone. It is adapted for use, more particularly, as a therapeutic and medicinal agent.

It will be understood to those skilled in the art, that in obtaining the general result desired, the specific process described may be modified within reasonable limits without departing from the spirit or substance of the invention, the scope of which is commensurate with the appended claims.

Having thus fully described the invention, what we claim as new and desire to secure by Letters Patent is:

1. As a new product, the iron salt of 2-phenylquinoline-4-carboxylic acid.

2. As a new product, a brown amorphous powder, insoluble in water, but soluble in alcohol or acetone and having the formula as follows:

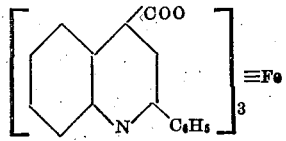

3. The process of making the iron salt of 2-phenylquinoline-4-carboxylic acid, which consists in treating a soluble salt of 2-phenylquinoline-4-carboxylic acid with an aqueous solution of a soluble ferric salt and thereafter extracting the resulting ferric salt.

4. The process of making the iron salt of 2-phenylquinoline-4-carboxylic acid, which consists in treating a sodium salt of 2-phenylquinoline-4-carboxylic acid with an aqueous solution of a soluble ferric salt and thereafter extracting the resulting ferric salt.

5. The process of making the iron salt of 2-phenylquinoline-4-carboxylic acid, which consists in treating a sodium salt of 2-phenylquinoline-4-carboxylic acid with an aqueous solution of ferric ammonium sulphate and thereafter extracting the resulting ferric salt, filtering off the precipitate which forms, and then extracting the resulting ferric salt therefrom by acetone.

6. The process of making the iron salt of 2-phenylquinoline-4-carboxylic acid, which consists in treating a sodium salt of 2-phenylquinoline-4-carboxylic acid with an aqueous solution of ferric ammonium sulphate and thereafter extracting the resulting ferric salt, filtering off the precipitate which forms, washing it with water and then drying and powdering it, then extracting it thoroughly with acetone so as to extract the ferric salt, concentrating said acetone solution, and thereafter cooling it so as to separate the ferric salt in the form of a precipitate.

7. The process of making the iron salt of 2-phenylquinoline-4-carboxylic acid, which consists in treating a sodium salt of 2-phenylquinoline-4-carboxylic acid with an aqueous solution of ferric ammonium sulphate and thereafter extracting the resulting ferric salt, filtering off the precipitate which forms, washing it with water and then drying and powdering it, then extracting it thoroughly with acetone so as to extract the ferric salt, concentrating said acetone solution, thereafter cooling it so as to separate the ferric salt in the form of a precipitate, filtering off said precipitate, and then drying it.

8. The process which consists in dissolving substantially 100 parts of 2-phenylquinoline-4-carboxylic acid in substantially 155.7 parts of 10% NaOH and 1500 parts of water, mixing with this solution about 64.5 parts of ferric ammonium sulphate dissolved in approximately 400 parts of water, filtering off the precipitate formed and then drying it.

In testimony whereof we have signed the foregoing specification.

MOSES L. CROSSLEY.
MAURICE L. DOLT.